Patented Nov. 28, 1950

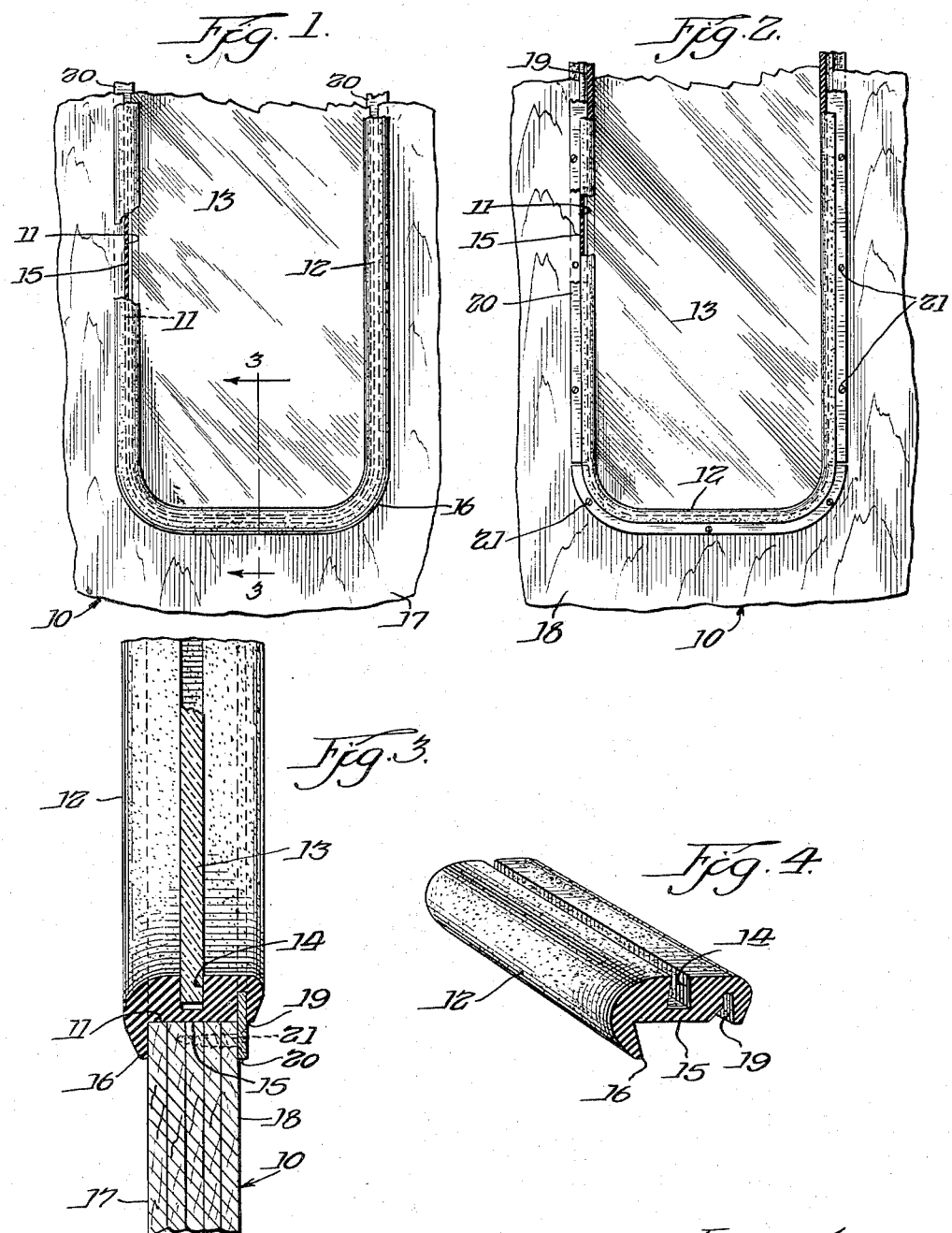

2,532,130

UNITED STATES PATENT OFFICE 2,532,130

WINDOW MOUNTING

Charles H. Turner, Webster, Mass., assignor to Pullman-Standard Car Manufacturing Company, Chicago, Ill., a corporation of Delaware Application August 30, 1946, Serial No. 693,859

4 Claims. (Cl. 20—56.4)

This invention relates to an improved mounting for the windows of vehicles and more especially to the mounting of glass in the entrance and exit doors of passenger vehicles.

The invention has for its principal object to provide a simple and efficient arrangement for mounting the glass in windows and doors of vehicles and which is adapted to facilitate the ready insertion and removal of the glass.

Specifically, the invention contemplates a flexible frame which is deformable for application to the glass and which is shaped and provided with a peripheral seat portion having circumjacent flange defining the depth of the seat and adapted for insertion directly into a window opening while containing the glass, with the peripheral seat engaged in the opening and the flange engaged at the surface around the opening to fix the position of the unit and having a groove coincident with the opposite surface adapted to receive a removable retaining member for locking the unit in place.

The invention is primarily intended for use on buses and the foregoing and other objects are attained by the arrangement illustrated in the accompanying drawings, in which:

Fig. 1 is a fragmentary outside elevational view of a window unit installed in accordance with the teaching of my invention, showing the glass mounted in my flexible member and the unit inserted in a window opening with the flexible frame and its continuous outer flange effectively sealing the space between the glass and the opening and around the opening;

Fig. 2 is a similar fragmentary elevational view of the window unit but illustrating the arrangement from the opposite or inner side and showing the sectional retaining member interlockingly engaging the flexible frame member and removably secured about the window opening by means of screws, thereby to lock the unit in place;

Fig. 3 is a fragmentary sectional view to larger scale taken on the line 3—3 of Fig. 1, illustrating a section through the glass mounting arrangement and showing the unit as completely installed in the window opening, with the glass mounted in its receiving channel in the flexible frame member and the outer peripheral flange engaged at the outer surface of the window opening to fix the position of the unit in the opening and act as a weather-seal, and showing the rigid retaining member secured at the inner surface of the window opening by means of screws and interlocked with the flexible frame member through the medium of the internal groove provided therein for the purpose; and Fig. 4 is a fragmentary detail perspective view of a portion of the flexible member showing it in its free condition with the glass receiving channel so proportioned as to provide a restricted opening or edge portion which is adapted closely to engage the glass to provide a contacting pressure and thus act as a positive seal against the entrance of weather, and having the outer peripheral flange disposed normally at an inclination, which, in the applied operative position provides an increased sealing pressure around the window opening.

As disclosed in the drawings, the invention has been illustrated as used in association with the entrance and exit doors of buses and trolley coaches, but is equally applicable to the installation of the other windows in such vehicles and especially where it is desirable to provide for the quick and economical application of windows with a minimum of effort and where it is necessary to insert the window from one side of the supporting structure and secure it from the opposite side.

In the drawings, 10 represents a structure in which a window is adapted to be mounted, and having a window opening 11. The structure 10 is comprised of wood, which may be plywood, as shown, or other lumber, but may be fabricated also of metal if desired. The window opening 11 is proportioned substantially to the size of the window unit to be installed and is adapted to be engaged by the unit about the entire perimeter thereof. The window unit is comprised of a flexible bead 12 which serves in the nature of a window frame, and a glass panel 13 which is adapted to be mounted in the bead member. The bead member 12 is comprised of rubber or the like and therefore is elastic and deformable for application to the glass 13 and is continuous about the glass and provided with an inwardly opening channel 14 for receiving the glass and is mounted on the glass panel before the thus assembled unit is inserted into the window opening 11.

The flexible frame member 12 is formed with an outer peripheral flat seat portion 15 extending continuously thereabout and which is adapted to seat within the window opening 11. The depth of the seat 15 is coincident with the depth of the window opening and is defined at one side by an outwardly directed flange 16 extending continuously about the unit and which engages the surface 17 about the window opening to limit the degree to which the unit can enter the opening and thus define the position of the window in the opening. Coincident with the opposite surface 18 about the window, the member 12 is provided with a recess 19 in the form of an undercut groove for the reception of a retaining member 20, which, after the insertion of the window unit in the opening 11 is adapted to be entered in the groove and removably secured by means of screws 21 entering the structure 10. The retaining member 20 is sectional to facilitate its insertion into the retaining groove 19 and comprises separate lengths at respective sides of the window unit and separate top and bottom portions shaped to the contour of the unit, all as best shown in Fig. 2.

It will be noted that the glass receiving channel 14, in the free condition of the flexible member 12, as shown in Fig. 4, is provided with a substantial toe-in at the mouth of the channel to assure a tight grip on the glass when the unit is installed and thus effectively seal the joint around the glass against the passage of weather. Similarly, the outwardly directed flange 16 is provided with a substantial toe-in to assure a tight grip on the structure 10 about the window opening, more effectively to seal the joint around the window unit as a whole. It will readily be seen that by reason of the toe-in of the flange 16, when the retaining member 20 is installed, a positive gripping action is effected on the structure 10 entirely about the window opening.

The window unit is mounted in the opening 11 with the sealing flange disposed to the outer side in engagement with the exterior surface 17 of the supporting structure 10 and with the retaining member installed from the interior side, so that once the unit is installed, it is necessary that it be released from the inner side before it can be removed. The portion of the flexible frame disposed to the outside of the glass is rounded off better to provide a more efficient water shedding surface, while the portion thereof disposed to the inner side of the glass is substantially flat. In the installation of the window unit, the flexible member 12 is first applied to the glass 13 and the assembled unit then inserted into the window opening 11 from one side, after which the sectional retaining member 20 may be entered into the groove 19 for locking the window unit in place, and secured by the screws 21. The flexible member 12 may be molded to the exact size and shape of the window with which it is to be used or it may be made in strip form and cut to length to fit around the window. In the first event, the member 12 will be continuous about the window, without a joint. In the latter event, it will be necessary that the cut length of the strip be so proportioned as to provide a tight fitting abutting joint in the assembled relation of the unit to insure weather tightness, or the abutting ends might be cemented to provide a sealed joint.

What is claimed is:

1. A demountable window unit comprising a glass panel and a mounting frame member adapted for insertion into a window opening as a preassembled unit, said frame member comprising an integral part of flexible material having an inwardly presented channel adapted continuously to embrace and receive said panel, an outwardly presented marginal seat portion extending continuously about said member in planes substantially at right angles to a plane parallel to said panel and adapted to engage within said opening, an outwardly directed sealing flange coextensive with said seat portion operatively disposed substantially at right angles thereto and disposed at one side thereof in position to engage the outside surface around the window opening to fix the position of the unit in said opening, an undercut groove in the frame member substantially coincident with the inside surface around the window opening and disposed wholly within the projected area of said opening, and a retaining member substantially parallel to said flange removably engaged in said groove and overlapping said inside surface to provide with said flange an outwardly directed channel engaging said outside and inside surfaces around the window opening beyond said marginal seat portion to secure said unit in the window opening.

2. A demountable window unit comprising a glass panel and a mounting frame member adapted for insertion into a window opening as a preassembled unit, said frame member comprising an integral part of flexible material adapted continuously to embrace said panel, an outwardly presented marginal seat portion extending continuously about said member in planes substantially at right angles to a plane parallel to said panel and adapted to engage within said opening, an outwardly directed sealing flange coextensive with said seat portion operatively disposed substantially at right angles thereto and disposed at one side thereof in position to engage the outside surface around the window opening to fix the position of the unit in said opening, an undercut groove in the frame member substantially coincident with the inside surface around the window opening and disposed wholly within the projected area of said opening, a retaining member substantially parallel to said flange removably engaged in said groove and overlapping said inside surface to provide with said flange an outwardly directed channel engaging said outside and inside surfaces around the window opening beyond said marginal seat portion to secure said unit in the window opening, and means releasably securing said retaining member to said inside surface.

3. A demountable window unit comprising a glass panel and a mounting frame member adapted for insertion into a window opening as a preassembled unit, said frame member comprising an integral part of flexible material having a sealing portion extending continuously around the window opening at one side and a portion extending through the opening beyond the other side, a groove in said extending portion continuous about the window opening disposed wholly within the projected area of said opening, and a retaining member removably engaged in said groove and overlapping said other side around the window opening to provide with said sealing portion an outwardly directed channel engaging said sides around the window opening in opposed relation to secure said unit in the opening.

4. A mounting frame member adapted for insertion into a window opening comprising an integral part of flexible material having an inwardly presented channel adapted continuously to embrace and receive a glass panel, an outwardly directed flange extending continuously around one edge thereof in engagement with a surface around said opening, and an outwardly presented recess adjacent the opposite edge thereof extending continuously around the frame member and disposed wholly within the projected area of said opening, a removable element engaged in said recess and overlapping a surface around the window opening in opposite relation to said first-named surface to provide with said flange an outwardly directed channel engaging said opposed surfaces around the window opening to retain said member in said opening, said removable element being comprised of a plurality of separate sections having means releasably maintaining their engagement in said recess.

CHARLES H. TURNER.

REFERENCES CITED

The following references are of record in the file of this patent:

UNITED STATES PATENTS

| Number | Name | Date |
|---|---|---|
| 1,487,748 | Maise | Mar. 25, 1924 |
| 1,602,868 | Teel | Oct. 12, 1926 |
| 2,129,404 | Bugatti | Sept. 6, 1938 |
| 2,255,725 | Trescher | Sept. 9, 1941 |
| 2,278,348 | Dutfield et al. | Mar. 31, 1942 |
| 2,405,394 | Austin | Aug. 6, 1946 |

FOREIGN PATENTS

| Number | Country | Date |
|---|---|---|
| 296,078 | Italy | May 7, 1932 |
| 42,390 | France | Apr. 25, 1933 |
| 525,322 | Great Britain | Aug. 26, 1940 |